United States Patent
Bi et al.

(10) Patent No.: US 12,442,952 B1
(45) Date of Patent: Oct. 14, 2025

(54) METHOD FOR CONFIGURING SLOPE REGULATION AND STORAGE MEASURES BASED ON FLOOD REGULATION AND STORAGE CAPACITY AND WATER CONSUMPTION CONTROL

(71) Applicant: China Institute of Water Resources and Hydropower Research, Beijing (CN)

(72) Inventors: Wuxia Bi, Beijing (CN); Denghua Yan, Beijing (CN); Cheng Zhang, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 0 days.

(21) Appl. No.: 19/201,063

(22) Filed: May 7, 2025

(30) Foreign Application Priority Data

Jun. 13, 2024 (CN) .......................... 202410761599.4

(51) Int. Cl.
*G01W 1/14* (2006.01)
*G06N 3/126* (2023.01)

(52) U.S. Cl.
CPC .............. *G01W 1/14* (2013.01); *G06N 3/126* (2013.01)

(58) Field of Classification Search
CPC ................................ G01W 1/14; G06N 3/126
See application file for complete search history.

(56) References Cited

U.S. PATENT DOCUMENTS

| | | | | |
|---|---|---|---|---|
| 2018/0355702 | A1* | 12/2018 | Chauveau | G01V 11/00 |
| 2019/0354873 | A1* | 11/2019 | Pescarmona | G06N 3/02 |
| 2023/0099257 | A1* | 3/2023 | Yang | G01V 20/00 703/10 |
| 2023/0273340 | A1* | 8/2023 | Yang | G01W 1/10 702/3 |
| 2024/0403978 | A1* | 12/2024 | Yang | G06Q 10/06315 |

* cited by examiner

*Primary Examiner* — Ricky Go
(74) *Attorney, Agent, or Firm* — Geoffrey Lottenberg; Berger Singerman LLP

(57) ABSTRACT

Provided is a method for configuring slope regulation and storage measures based on flood regulation and storage capacity and water consumption control, including the following steps: S1, collecting and organizing precipitation data of a basin; S2, constructing an optimized configuration model based on a balance between flood regulation and storage capacity improvement and slope water consumption control; S3, initializing settings; S4, computing an optimal comprehensive benefit of the slope regulation and storage measures with a genetic algorithm; and S5, determining whether a number of iterations is maximized; if the number of iterations is maximized, terminating an iteration and outputting data, such that a computation is completed; and if the number of iterations is not maximized, returning to the S4, and restarting the computation. The optimized configuration model of this application can resolve a balanced relationship between flood regulation and storage capacity improvement and slope water consumption control.

5 Claims, 1 Drawing Sheet

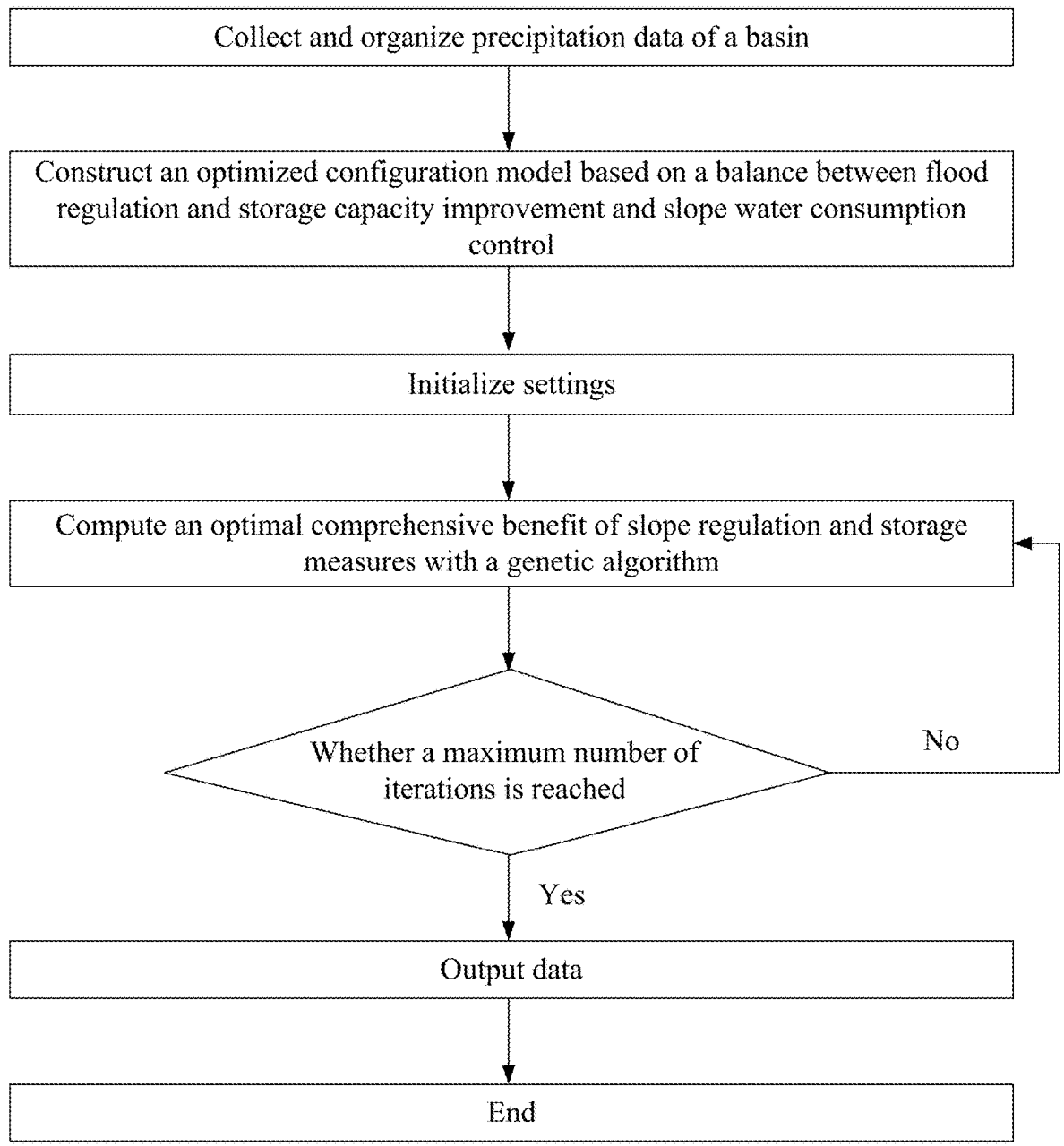

METHOD FOR CONFIGURING SLOPE REGULATION AND STORAGE MEASURES BASED ON FLOOD REGULATION AND STORAGE CAPACITY AND WATER CONSUMPTION CONTROL

CROSS REFERENCE TO RELATED APPLICATION

This patent application claims the benefit and priority of Chinese Patent Application No. 202410761599.4, filed with the China National Intellectual Property Administration on Jun. 13, 2024, the disclosure of which is incorporated by reference herein in its entirety as part of the present application.

TECHNICAL FIELD

The present disclosure relates to the technical field of hydraulic engineering, and especially relates to the technical fields of flood regulation and storage and water conservation. Specifically, the present disclosure provides a method for optimized configuration of slope regulation and storage measures based on a balance between flood regulation and storage capacity improvement and slope water consumption control.

BACKGROUND

The ecological engineering prevention and control has gradually become a significant action for addressing flood disasters in river basins. The scientific configuration of regulation and storage measures during a rainfall-runoff generation process on a slope is a key for the ecological engineering prevention and control. Under extreme precipitation, slope regulation and storage measures such as forest and grass vegetation projects and natural restoration projects affect the runoff generation, sediment yield, and soil moisture on slopes. On the one hand, the slope regulation and storage measures can attenuate the flood peak, prolong the flood duration, and mitigate the flood damage. On the other hand, the arrangement of vegetation construction measures on slopes will cause specified water consumption and reduce the runoffs entering river channels. The scientific configuration of slope regulation and storage measures is crucial for balancing flood control/mitigation and slope water generation/consumption. Currently, most of the relevant studies focus on the influence of indexes such as slope gradient and vegetation coverage degree on the single goals such as slope flood regulation and storage capacity or slope water consumption. However, there are few studies on the changes in coupling between flood regulation and storage capacity and water consumption for slopes under extreme precipitation. Therefore, it is necessary to propose a method for optimized configuration based on a balance between flood regulation and storage capacity improvement and slope water consumption control, so as to achieve the reasonable allocation of flood control/mitigation and water resources for river basins.

SUMMARY

An objective of the present disclosure is to provide a method for optimized configuration of slope regulation and storage measures based on a balance between flood regulation and storage capacity improvement and slope water consumption control. This method can resolve a balanced relationship between flood regulation and storage capacity improvement and slope water consumption control. That is, this method can maximize the comprehensive benefit with a maximum flood regulation and storage capacity and a minimum slope water consumption as constraint objectives. Unlike the existing studies focusing on the influence of indexes such as slope gradient and vegetation coverage degree on the single goals such as slope flood regulation and storage capacity or slope water consumption, the present disclosure can achieve the reasonable allocation of flood control/mitigation and water resources for river basins.

To achieve the above objective, the present disclosure adopts the following technical solutions:

A method for configuring slope regulation and storage measures based on flood regulation and storage capacity and water consumption control is provided, including the following steps:

S1, collecting and organizing precipitation data of a basin;

S2, constructing an optimized configuration model based on a balance between flood regulation and storage capacity improvement and slope water consumption control, including the following steps:

S2-1, flood regulation and storage objective: maximizing a water storage ratio and a flood peak attenuation rate in a control unit to improve a flood regulation and storage capacity $FR_i$, which is specifically as follows:

$$FR_{i,Max} = \text{Max}(WS_i, FPR_i) \quad (1)$$

where, $$WS_i = \frac{P_i - R_i}{P_i} \quad (2)$$

$$R_i = f(Pi, Si, Vi) \quad (3)$$

$$FPR_i = \frac{FP_{b,i} - FP_{v,i}}{FP_{b,i}} \quad (4)$$

In the above formulas, $WS_i$ represents a water storage ratio in a unit i; $FPR_i$ represents a flood peak attenuation rate in the unit i; $P_i$ represents a precipitation in the unit i, mm; $R_i$ represents a total runoff yield in the unit i, mm; $f$ represents a functional relationship of $R_i$ with a precipitation, a slope gradient, and a vegetation coverage degree; $S_i$ represents a slope gradient in the unit i; $V_i$ represents a vegetation coverage degree in the unit i; $FP_{b,i}$ represents a flood peak flow rate in the unit i without a slope vegetation construction measure, m³/s; and $FP_{v,i}$ represents a flood peak flow rate in the unit i with a slope vegetation construction measure, m³/s;

S2-2, water consumption control objective: minimizing a water demand and a transpiration of a vegetation on a slope to allow the water consumption control objective $WC_i$ on the slope, which is specifically as follows:

$$WC_{i,Min} = \text{Min}\left(\frac{WD_i}{P_i}, \frac{ET_i}{P_i}\right) \quad (5)$$

where,

-continued $$WD_i = WD_{g,i} + WD_{f,i} = g(Vi) \tag{6}$$

$$ET_i = \varphi(V_i) \tag{7}$$

In the above formulas, $WD_i$ represents a water demand of a vegetation in the unit i, mm; $WD_{g,i}$ represents a water demand of a grassland in the unit i, mm; $WD_{f,i}$ represents a water demand of a forestland in the unit i, mm; g represents a functional relationship of $WD_i$ with a vegetation coverage degree; $V_i$ represents a vegetation coverage degree in the unit i; $ET_i$ represents a transpiration of a vegetation in the unit i, mm; and φ represents a functional relationship of $ET_i$ with a vegetation coverage degree;

S2-3, based on a maximum flood regulation and storage capacity and a minimum slope water consumption for multi-objective optimized configuration of the slope regulation and storage measures, transforming a multi-objective function into a single-objective function with a comprehensive benefit index $CE_i$ as a target; and calculating a maximum value of $CE_i$ through a trade-off relationship between flood regulation and storage and slope water consumption, where a corresponding slope gradient and coverage degree are optimal solutions, and a calculation formula for the comprehensive benefit index is as follows:

$$CE_i = \omega_1 \times \frac{FR_i}{\overline{FR}} - \omega_2 \times \frac{WC_i}{\overline{WC}} \tag{8}$$

where, $$\omega_1 + \omega_2 = 1, \omega_1 > 0, \omega_2 > 0 \tag{9}$$

In the above formulas, $CE_i$ represents a comprehensive benefit index for slope regulation and storage measures in the unit i; $FR_i$ represents a flood regulation and storage capacity index for the slope regulation and storage measures in the unit i; $\overline{FR}$ represents an average flood regulation and storage capacity for slope regulation and storage measures in different units; $WC_i$ represents a water consumption control index for the slope regulation and storage measures in the unit i; $\overline{WC}$ represents an average water consumption control value for slope regulation and storage measures in different units; and $\omega_1$ and $\omega_2$ represent weight values, which are determined according to simulation experiments;

S3, initializing settings;

S4, computing an optimal comprehensive benefit of the slope regulation and storage measures with a genetic algorithm: calculating a fitness of each individual with the genetic algorithm, and evaluating performance of each individual according to a target, where an individual with a high fitness represents a high-quality solution, each individual is provided with a slope gradient and a coverage degree, and the target is the comprehensive benefit index for the slope regulation and storage measures; and S5, determining whether a number of iterations is maximized; if the number of iterations is maximized, terminating an iteration and outputting data to produce a slope gradient and a coverage degree corresponding to the optimal comprehensive benefit of the slope regulation and storage measures, such that a computation is completed; and if the number of iterations is not maximized, returning to the S4, and restarting the computation.

The collecting and organizing precipitation data of a basin in the S1 includes: collecting observation data from rainfall stations and hydrologic stations within the basin, and selecting data of flood-triggering rainfall events as representative precipitation data.

Further, the S2-3 includes the following steps:
(a) determining a flood regulation and storage capacity of the slope regulation and storage measures with a maximum flood regulation and storage capacity including a maximum water storage ratio and a maximum flood peak attenuation rate in the control unit as a first criterion; and
(b) integrating flood regulation and storage capacity and water consumption control data of the slope regulation and storage measures to establish the comprehensive benefit index; according to the comprehensive benefit index, determining an optimal slope gradient and vegetation coverage degree; and based on a threshold of a total slope regulation and storage capacity in the control unit, conducting secondary configuration to determine a zoning and classification optimization solution.

Further, the initializing settings in the S3 includes: with a slope gradient set to $S_i=0°$ and a boundary condition set to $0°\leq S_i \leq 90°$, calculating a step size $\Delta S_i=1°$; and with a vegetation coverage degree set to $V_i=0$ and a boundary condition set to $0\leq V_i \leq 100\%$, calculating a step size $\Delta V_i=1\%$.

Further, the computation with the genetic algorithm in the S4 includes: 1) initialization: creating an initial population, where each individual in the initial population represents a potential solution, each individual is provided with a slope gradient and a vegetation coverage degree, and each individual is represented by a chromosome; 2) fitness evaluation: calculating the fitness of each individual to determine a quality of each individual, and evaluating the performance of each individual with a fitness function according to a target of a problem, where an individual with a high fitness to the target of the problem represents a high-quality solution, and the target of the problem is the comprehensive benefit index for the slope regulation and storage measures; 3) selection: based on fitness values, selecting a plurality of individuals from a current population as parents for breeding of offspring; 4) crossover: combining the selected parents through crossover operations to produce new offspring individuals; 5) mutation: conducting mutation operations for the offspring individuals: randomly modifying gene values at some chromosomal positions for simulating mutation processes in biological evolution to ensure a diversity of a population; 6) replacement: replacing individuals in the original population with the new individuals to produce a new-generation population; and 7) repetition: repeating the evaluation, the selection, the crossover, and the mutation until a termination condition is met, where the termination condition is that the number of iterations is maximized.

The above technical solutions have the following beneficial effects: An optimized configuration model is constructed and used in combination with a genetic algorithm, actual observations, etc. to resolve a balanced relationship between flood regulation and storage capacity improvement and slope water consumption control with a maximum flood regulation and storage capacity and a minimum slope water consumption as constraint objectives, so as to maximize the comprehensive benefit of reasonable configuration of flood control/mitigation and water resources for a river basin.

BRIEF DESCRIPTION OF THE DRAWING

The present disclosure will be further described in detail below with reference to accompanying drawings and specific implementations.

FIG. 1 is a schematic diagram of a model construction flow in the method of the present disclosure.

DETAILED DESCRIPTION OF THE EMBODIMENTS

Example 1

A method for configuring slope regulation and storage measures based on flood regulation and storage capacity and water consumption control was provided, including the following steps:

S1. Precipitation data of a basin was collected and organized: Observation data from rainfall stations and hydrologic stations within the basin was collected, and data of flood-triggering rainfall events was selected as representative precipitation data.

S2. An optimized configuration model based on a balance between flood regulation and storage capacity improvement and slope water consumption control was constructed, including the following steps:

S2-1. Flood regulation and storage objective: A water storage ratio and a flood peak attenuation rate in a control unit were maximized to improve a flood regulation and storage capacity $FR_i$, which was specifically as follows:

$$FR_{i,Max} = \text{Max}(WS_i, FPR_i) \quad (1)$$

where, $$WS_i = \frac{P_i - R_i}{P_i} \quad (2)$$

$$R_i = f(Pi, Si, Vi) \quad (3)$$

$$FPR_i = \frac{FP_{b_i} - FP_{v_i}}{FP_{b_i}} \quad (4)$$

In the above formulas, $WS_i$ represents a water storage ratio in a unit i; $FPR_i$ represents a flood peak attenuation rate in the unit i; $P_i$ represents a precipitation in the unit i, mm; $R_i$ represents a total runoff yield in the unit i, mm; $f$ represents a functional relationship of $R_i$ with a precipitation, a slope gradient, and a vegetation coverage degree; $S_i$ represents a slope gradient in the unit i; $V_i$ represents a vegetation coverage degree in the unit i; $FP_{b_i}$ represents a flood peak flow rate in the unit i without a slope vegetation construction measure, m³/s; and $FP_{v_i}$ represents a flood peak flow rate in the unit i with a slope vegetation construction measure, m³/s.

S2-2. Water consumption control objective: A water demand and a transpiration of a vegetation on a slope were minimized to allow the water consumption control objective $WC_i$ on the slope, which was specifically as follows:

$$WC_{i,Min} = \text{Min}\left(\frac{WD_i}{P_i}, \frac{ET_i}{P_i}\right) \quad (5)$$

where, $$WD_i = WD_{g,i} + WD_{f,i} = g(Vi) \quad (6)$$

$$ET_i = \varphi(V_i) \quad (7)$$

In the above formulas, $WD_i$ represents a water demand of a vegetation in the unit i, mm; $WD_{g,i}$ represents a water demand of a grassland in the unit i, mm; $WD_{f,i}$ represents a water demand of a forestland in the unit i, mm; g represents a functional relationship of $WD_i$ with a vegetation coverage degree; $V_i$ represents a vegetation coverage degree in the unit i; $ET_i$ represents a transpiration of a vegetation in the unit i, mm; and φ represents a functional relationship of $ET_i$ with a vegetation coverage degree.

S2-3. Based on a maximum flood regulation and storage capacity and a minimum slope water consumption for multi-objective optimized configuration of the slope regulation and storage measures, a multi-objective function was transformed into a single-objective function with a comprehensive benefit index as a target. A maximum value of $CE_i$ was calculated through a trade-off relationship between flood regulation and storage and slope water consumption. A corresponding slope gradient and coverage degree were optimal solutions.

(a) A flood regulation and storage capacity of the slope regulation and storage measures was determined with a maximum flood regulation and storage capacity including a maximum water storage ratio and a maximum flood peak attenuation rate in the control unit as a first criterion.

(b) Flood regulation and storage capacity and water consumption control data of the slope regulation and storage measures was integrated to establish the comprehensive benefit index. According to the comprehensive benefit index, an optimal slope gradient and vegetation coverage degree were determined. Based on a threshold of a total slope regulation and storage capacity in the control unit (which was determined by formulas (1) to (4)), secondary configuration was conducted to determine a zoning and classification optimization solution.

A calculation formula for the comprehensive benefit index was as follows:

$$CE_i = \omega_1 \times \frac{FR_i}{\overline{FR}} - \omega_2 \times \frac{WC_i}{\overline{WC}} \quad (8)$$

where, $$\omega_1 + \omega_2 = 1, \omega_1 > 0, \omega_2 > 0 \quad (9)$$

In the above formulas, $CE_i$ represents a comprehensive benefit index for slope regulation and storage measures in the unit i; $FR_i$ represents a flood regulation and storage capacity index for the slope regulation and storage measures in the unit i; $\overline{FR}$ represents an average flood regulation and storage capacity for slope regulation and storage measures in different units; $WC_i$ represents a water consumption control index for the slope regulation and storage measures in the unit i; $\overline{WC}$ represents an average water consumption control value for slope regulation and storage measures in different units; and $\omega_1$ and $\omega_2$ represent weight values.

S3. Settings were initialized: With a slope gradient set to $S_i=0°$ and a boundary condition set to $0°\leq S_i \leq 90°$, a step size $\Delta S_i=1°$ was calculated. With a vegetation coverage degree set to $V_i=0$ and a boundary condition set to $0\leq V_i \leq 100\%$, a step size $\Delta V_i=1\%$ was calculated.

S4. An optimal comprehensive benefit of the slope regulation and storage measures was computed with a genetic algorithm: A fitness of each individual was calculated with the genetic algorithm, and performance of each individual was evaluated according to a target. An individual with a high fitness represented a high-quality solution. Each individual was provided with a slope gradient and a coverage degree. The target was the comprehensive benefit index for the slope regulation and storage measures.

The computation with the genetic algorithm included: 1) Initialization: An initial population was created. Each individual in the initial population represented a potential solution. The individual in the present disclosure was provided with a slope gradient and a vegetation coverage degree. Each individual was represented by a chromosome (it could be a binary, a real number, or another data structure, and an initialization mode could be random generation or specific rule-based generation). 2) fitness evaluation: The fitness of each individual was calculated to determine a quality of each individual. The performance of each individual was evaluated with a fitness function according to a target of a problem. An individual with a high fitness to the target of the problem represented a high-quality solution. The target of the problem in the present disclosure was the comprehensive benefit index for the slope regulation and storage measures. 3) Selection: Based on fitness values, a plurality of individuals were selected from a current population as parents for breeding of offspring (common selection methods included roulette wheel selection, tournament selection, rank-based selection, etc.). 4) Crossover: The selected parents were combined through crossover operations (also known as recombination) to produce new offspring individuals (this usually involved the exchange a part of the genetic information of chromosomes of the parents to mimic the gene recombination in biogenetics). 5) Mutation: Mutation operations were conducted for the offspring individuals. Gene values were randomly modified at some chromosomal positions for simulating mutation processes in biological evolution to ensure a diversity of a population. 6) Replacement: Individuals in the original population (parents) were replaced with the new individuals (offspring) to produce a new-generation population (there were many replacement strategies, including complete replacement and partial replacement). 7) Repetition: The evaluation, the selection, the crossover, and the mutation were repeated until a termination condition was met. The termination condition in the present disclosure was that the number of iterations was maximized.

S5. Whether a number of iterations was maximized was determined. If the number of iterations was maximized, an iteration was terminated, and data was output to produce a slope gradient and a coverage degree corresponding to the optimal comprehensive benefit of the slope regulation and storage measures, such that a computation was completed. If the number of iterations was not maximized, it returned to the S4, and the computation was restarted. With a comprehensive benefit of the slope regulation and storage measures as a final index, a Pi River basin was optimized with the method in this example. Optimization results were as follows: a slope gradient: 28° C., and a vegetation coverage degree: 60%.

The above description is proposed merely as a technical solution that can be implemented by the present disclosure, and does not serve as a single restriction on the technical solution itself.

What is claimed is:

1. A method for configuring slope regulation and storage measures based on flood regulation and storage capacity and water consumption control, comprising the following steps:
S1, collecting and organizing precipitation data of a basin;
S2, constructing an optimized configuration model based on a balance between flood regulation and storage capacity improvement and slope water consumption control, comprising the following steps:
S2-1, flood regulation and storage objective: maximizing a water storage ratio and a flood peak attenuation rate in a control unit to improve a flood regulation and storage capacity $FR_i$, which is specifically as follows:

$$FR_{i,Max} = \text{Max}(WS_i, FPR_i) \quad (1)$$

wherein, $$WS_i = \frac{P_i - R_i}{P_i} \quad (2)$$

$$R_i = f(Pi, Si, Vi) \quad (3)$$

$$FPR_i = \frac{FP_{b,i} - FP_{v,i}}{FP_{b,i}} \quad (4)$$

wherein $WS_i$ represents a water storage ratio in a unit i; $FPR_i$ represents a flood peak attenuation rate in the unit i; $P_i$ represents a precipitation in the unit i, mm; $R_i$ represents a total runoff yield in the unit i, mm; $f$ represents a functional relationship of $R_i$ with a precipitation, a slope gradient, and a vegetation coverage degree; $S_i$ represents a slope gradient in the unit i; $V_i$ represents a vegetation coverage degree in the unit i; $FP_{b,i}$ represents a flood peak flow rate in the unit i without a slope vegetation construction measure, m³/s; and $FP_{v,i}$ represents a flood peak flow rate in the unit i with a slope vegetation construction measure, m³/s;

S2-2, water consumption control objective: minimizing a water demand and a transpiration of a vegetation on a slope to allow the water consumption control objective $WC_i$ on the slope, which is specifically as follows:

$$WC_{i,Min} = \text{Min}\left(\frac{WD_i}{P_i}, \frac{ET_i}{P_i}\right) \quad (5)$$

wherein, $$WD_i = WD_{g,i} + WD_{f,i} = g(Vi) \quad (6)$$

$$ET_i = \varphi(V_i) \quad (7)$$

wherein $WD_i$ represents a water demand of a vegetation in the unit i, mm; $WD_{g,i}$ represents a water demand of a grassland in the unit i, mm; $WD_{f,i}$ represents a water demand of a forestland in the unit i, mm; g represents a functional relationship of $WD_i$ with a vegetation coverage degree; $V_i$ represents a vegetation coverage degree in the unit i; $ET_i$ represents a transpiration of a vegetation in the unit i, mm; and $\varphi$ represents a functional relationship of $ET_i$ with a vegetation coverage degree;

S2-3, based on a maximum flood regulation and storage capacity and a minimum slope water consumption for multi-objective optimized configuration of the slope regulation and storage measures, transforming a multi-objective function into a single-objective function with a comprehensive benefit index $CE_i$ as a target; and calculating a maximum value of $CE_i$ through a trade-off relationship between flood regulation and storage and slope water consumption, wherein a corresponding slope gradient and coverage degree are optimal solutions, and a calculation formula for the comprehensive benefit index is as follows:

$$CE_i = \omega_1 \times \frac{FR_i}{\overline{FR}} - \omega_2 \times \frac{WC_i}{\overline{WC}} \quad (8)$$

wherein, $$\omega_1 + \omega_2 = 1, \omega_1 > 0, \omega_2 > 0 \quad (9)$$

wherein $CE_i$ represents a comprehensive benefit index for slope regulation and storage measures in the unit i; $FR_i$ represents a flood regulation and storage capacity index for the slope regulation and storage measures in the unit i; $\overline{FR}$ represents an average flood regulation and storage capacity for slope regulation and storage measures in different units; $WC_i$ represents a water consumption control index for the slope regulation and storage measures in the unit i; $\overline{WC}$ represents an average water consumption control value for slope regulation and storage measures in different units; and $\omega_1$ and $\omega_2$ represent weight values;

S3, initializing settings;

S4, computing an optimal comprehensive benefit of the slope regulation and storage measures with a genetic algorithm: calculating a fitness of each individual with the genetic algorithm, and evaluating performance of each individual according to a target, wherein an individual with a high fitness represents a high-quality solution, each individual is provided with a slope gradient and a coverage degree, and the target is the comprehensive benefit index for the slope regulation and storage measures;

S5, determining whether a number of iterations is maximized; if the number of iterations is maximized, terminating an iteration and outputting data to produce a slope gradient and a coverage degree corresponding to the optimal comprehensive benefit of the slope regulation and storage measures, such that a computation is completed; and if the number of iterations is not maximized, returning to the S4, and restarting the computation; and S6, configuring a slope gradient and a vegetation coverage degree of the basin according to the slope gradient and the coverage degree corresponding to the optimal comprehensive benefit of the slope regulation and storage measures.

2. The method for configuring slope regulation and storage measures based on flood regulation and storage capacity and water consumption control according to claim 1, wherein the collecting and organizing precipitation data of the basin in the S1 comprises: collecting observation data from rainfall stations and hydrologic stations within the basin, and selecting data of flood-triggering rainfall events as representative precipitation data.

3. The method for configuring slope regulation and storage measures based on flood regulation and storage capacity and water consumption control according to claim 1, wherein the S2-3 comprises the following steps:

(a) determining a flood regulation and storage capacity of the slope regulation and storage measures with a maximum flood regulation and storage capacity comprising a maximum water storage ratio and a maximum flood peak attenuation rate in the control unit as a first criterion; and (b) integrating flood regulation and storage capacity and water consumption control data of the slope regulation and storage measures to establish the comprehensive benefit index; according to the comprehensive benefit index, determining an optimal slope gradient and vegetation coverage degree; and based on a threshold of a total slope regulation and storage capacity in the control unit, conducting secondary configuration to determine a zoning and classification optimization solution.

4. The method for configuring slope regulation and storage measures based on flood regulation and storage capacity and water consumption control according to claim 1, wherein the initializing settings in the S3 comprises: with a slope gradient set to $S_i=0°$ and a boundary condition set to $0°\leq S_i \leq 90°$, calculating a step size $\Delta S_i=1°$; and with a vegetation coverage degree set to $V_i=0$ and a boundary condition set to $0\leq V_i \leq 100\%$, calculating a step size $\Delta V_i=1\%$.

5. The method for configuring slope regulation and storage measures based on flood regulation and storage capacity and water consumption control according to claim 1, wherein the computation with the genetic algorithm in the S4 comprises: 1) initialization: creating an initial population, wherein each individual in the initial population represents a potential solution, each individual is provided with a slope gradient and a vegetation coverage degree, and each individual is represented by a chromosome; 2) fitness evaluation: calculating the fitness of each individual to determine a quality of each individual, and evaluating the performance of each individual with a fitness function according to a target of a problem, wherein an individual with a high fitness to the target of the problem represents a high-quality solution, and the target of the problem is the comprehensive benefit index for the slope regulation and storage measures; 3) selection: based on fitness values, selecting a plurality of individuals from a current population as parents for breeding of offspring; 4) crossover: combining the selected parents through crossover operations to produce new offspring individuals; 5) mutation: conducting mutation operations for the offspring individuals: randomly modifying gene values at some chromosomal positions for simulating mutation processes in biological evolution to ensure a diversity of a population; 6) replacement: replacing individuals in the original population with the new individuals to produce a new-generation population; and 7) repetition: repeating the evaluation, the selection, the crossover, and the mutation until a termination condition is met, wherein the termination condition is that the number of iterations is maximized.

\* \* \* \* \*